NEGATIVE RESISTANCE USING TRANSISTORS

Filed Feb. 15, 1955

INVENTOR:
JOHANNES S. SCHAFFNER,
BY George Veltgrath
HIS ATTORNEY.

United States Patent Office 2,864,062

Patented Dec. 9, 1958

2,864,062

NEGATIVE RESISTANCE USING TRANSISTORS

Johannes S. Schaffner, Syracuse, N. Y., assignor to General Electric Company, a corporation of New York Application February 15, 1955, Serial No. 488,310

2 Claims. (Cl. 333—80)

This invention relates to negative resistance networks and more particularly to networks of this character utilizing transistor devices. In many applications, such as switching circuits, active filters, storage devices, and others, it is desirable to provide a device which will produce a negative or falling characteristic. A circuit having a negative characteristic is one in which an increase in current through it produces a decrease rather than an increase in voltage across it. Such characteristics have been obtained using dynatrons, point contact transistors, double base diodes and combinations of triodes.

It is an object of the present invention to provide a new and novel circuit for providing a negative resistance using transistors. The circuit is simple, in that it requires a minimum of components to produce the desired negative characteristics. A constant negative impedance may be obtained over a wide frequency range with the disclosed network. This result overcomes many of the deficiencies associated with previously known devices.

It is a further object of the invention to present a configuration of junction type transistors which will produce a negative characteristic previously not available from the junction type transistor.

These and other advantages of the invention will be readily understood from the following description taken in connection with the accompanying drawings and its scope will be apparent from the appended claims.

Figure 1:
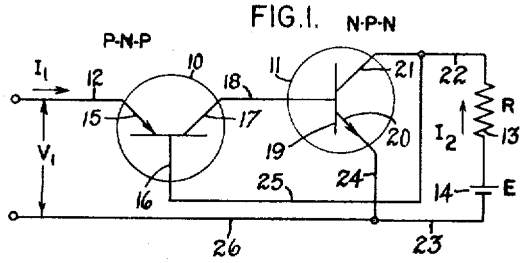
Fig. 1 is a diagrammatic illustration of the invention in its simplest form showing a network comprising two transistors, a source of electric energy and a resistance.

Fig. 1 shows an illustrative embodiment of the invention consisting of one PNP and one NPN transistor, a resistor and a source of electric potential. Operating connections to this circuit are made between the emitter 15 of PNP transistor 10 and the emitter 20 of NPN transistor 11 through leads 12 and 26, respectively. The collector 17 of transistor 10 is connected through lead 18 to base 19 of transistor 11 and base 16 of transistor 10 is connected through lead 25 to collector 21 of transistor 11. A source of potential 14 has its negative pole connected to emitter 20 through leads 23 and 24, and its positive pole connected through resistance 13 and lead 22 to the collector 21.

Figure 2:
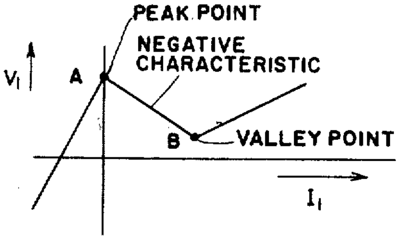
Fig. 2 illustrates the operating characteristics of the network shown in Fig. 1.

The principles of the invention can be comprehended best by an analysis of the basic circuit shown in Fig. 1 taken in connection with the characteristic curve shown in Fig. 2.

Fig. 2 illustrates the input voltage versus current curve describing the operating characteristic of the circuit shown in Fig. 1. The characteristic curve may be conveniently divided for reference purposes into three regions, and the circuit will be analyzed with respect to each region.

In region I, the emitter 15 is biased inversely, consequently, will not conduct. Under this condition the input current $I_1$ is extremely small, as expected of a reversely biased PN junction. The bias is supplied by the source of potential E and has a magnitude given by the difference between this voltage and the IR drop in resistance 13. This condition persists until the bias is overcome by the increasing input potential $V_1$. At this point, emitter 15 begins to conduct. The curve of Fig. 2 shows this peak point A at the end of region I. If the small drop across the two transistors is neglected, this point is located at $$V_1 \cong E - I_{c2}R \qquad (1)$$

where $I_{c2}$ is the current through collector 21 of transistor 13 when emitter 15 is non-conducting.

Region II shows the desired negative characteristic. In this region both transistors are biased properly so that current flows through the emitter junction in the easy direction. Under these conditions $$V_1 \cong E - RI_2 \qquad (2)$$

where $I_2$ is the current flowing through R. Equation 2 neglects the emitter to base voltage drop which is small when the transistor is conducting. Since, in most commercially available junction transistors alpha approaches unity, it may be said that $$I_2 \cong \frac{\alpha_2}{1-\alpha_2} I_1 \qquad (3)$$

where $\alpha_2$ is the short circuit current amplification of the second transistor in the grounded base configuration. Substituting the value of $I_2$ in Equation 2, then, $$V_1 = E - \frac{\alpha_2}{1-\alpha_2} I_1 R \qquad (4)$$

The input slope and apparent resistance presented to A. C. is therefore $$R_1 = \left.\frac{\partial V_1}{\partial I_1}\right|_E = -\frac{\alpha_2}{1-\alpha_2} R \qquad (5)$$

Note that $R_1$ is negative and that, within the operating region where this relationship is satisfied, $R_1$ is a substantially linear function of R. Thus a larger R will produce a greater negative slope on Fig. 2.

The preceding mathematical explanation demonstrates why this network exhibits negative resistance. The same result may be qualitatively surmised by observing the current reactions in the circuit. Beginning again where emitter 15 begins conducting, the current $I_1$ between emitter 15 and base 16 passes over the lead 25 through resistance 13. Since the second transistor is the NPN type, the current $I_2$ will flow through resistance 13, lead 22 and collector 21 to emitter 20. It will be noted that $I_2$ is opposing the current $I_1$ and is of greater magnitude due to the current gain of the transistor pair. Thus as $I_1$ continues to increase so does $I_2$ by transistor action and $V_1$ continues to decrease producing the negative characteristic shown in Fig. 2.

The negative characteristic will continue until the drop across R becomes so large that the potential on the collectors is approximately equal to their respective base potentials. Then transistor action ceases, producing the valley point B shown on Fig. 2. The input circuit then becomes essentially a diode which appears at PN junction 15—16 in series with resistance 13 and source 24. The input resistance is low and substantially equal to R in this region and little change will appear in region III of Fig. 2.

Experimental values used for plotting a curve such as shown on Fig. 2 are as follows:

For $R=600$ and $E=6$ volts

Peak point:

$V_1=4.5$ volts $I_1=0$

Valley point:

$V_1=.25$ volts $I_1=.45$ ma.

These experimental values show the peak point on the curve in Fig. 2 to occur when $V_1 \cong E_1 - I_2 R$, neglecting the drop across the transistors. Doubling the value of R doubled the negative slope of region II which would be expected in view of Equation 5 and reduced the voltage at the peak point.

Figure 3:
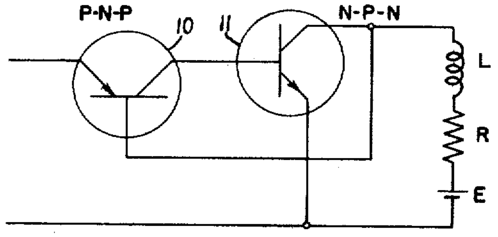
Fig. 3 is a modification of Fig. 1 which provides a negative resistance over a wide frequency range.

It has been found that a constant and real negative-resistance may be obtained over an extended frequency range if the load impedance comprises a resistive and an inductive component in series. Fig. 3 shows such a modification. Experimentation has shown that the A. C. input resistance in region II is independent of the battery voltage E at low frequencies. However, the magnitude of alpha decreases with increasing frequency, and there is a phase shift of alpha at higher frequencies. Therefore, the input resistance will become complex with increasing operating frequencies since $$Z_1 = \frac{\alpha_2}{1-\alpha_2} R_L \qquad (6)$$

becomes complex. With the addition of an inductance in series with the load resistance, the input impedance may be expressed:

$$Z_1 = \frac{\alpha_2}{1-\alpha_2}(R + jWL) \qquad (7)$$

where $(W=2\pi f)$. Since $\alpha_2$ at higher frequencies is approximately $$\alpha_2 = \frac{\alpha_{2_0}}{1 + jW/W\alpha_2} \qquad (8)$$

where $\alpha_{2_0}$ is the $\alpha_2$ at zero frequency and $W/W_{\alpha 2}$ is the ratio between W's at the operating and cut-off frequencies, then:

$$Z_1 = \frac{\alpha_{2_0}(R_L + jWL)}{1 - \alpha_{2_0} + jW/W\alpha_2} \qquad (9)$$

The negative resistance will be real if:

$$L = \frac{R_L}{(1 - W_{2_0})W\alpha_2} \qquad (10)$$

Figure 4:
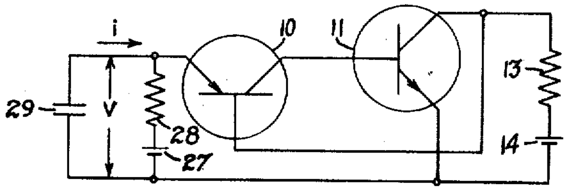
Fig. 4 is a diagrammatic illustration of the invention as applied to a free running oscillator.
Figure 5:
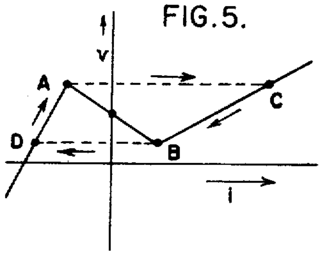
Fig. 5 illustrates the operating characteristics of the circuit shown in Fig. 4.

The negative input resistance obtained in the manner described may be used in a variety of circuits where such a characteristic is deemed desirable. Fig. 4 shows the invention being applied in a free running oscillator. A capacitance 29 and a resistance 28 in series with a source of potential 27 are connected across the emitters of transistors 10 and 11 of Fig. 1. The network in Fig. 1 is used to supply the requisite negative resistance in order that the composite circuit formed by the addition of elements 27, 28 and 29 may function as an oscillator. The relationship of the voltage across capacitance 29 and the current $i$ through it may be expressed by the equation $$\frac{dv}{dt} = -Ci \qquad (11)$$

which means that the voltage across the capacitance decreases as current flows from it. The voltage and current must either increase or decrease with time except where $i=0$, then the voltage will remain constant. If the point where $i=0$ is selected to appear on the negative slope of the characteristic curve shown in Fig. 5, then the circuit of Fig. 4 will oscillate. The voltage change is indicated on Fig. 5 by the direction of the arrows. It will be noted that at points A and B the voltage can advance no further and the current must jump to another portion of the characteristic curve. It is assumed that the voltage remains substantially constant during this jump. The direction of the current jump will be from A to C and from B to D. This oscillator will produce approximately a square wave. It could be converted to a sinusoidal oscillator by inserting an inductance in series with capacitance 29. Other uses may include monostable and bistable switching circuits and in active filters when the quality factor Q of a network may be increased by the use of a negative resistance.

Figure 6:
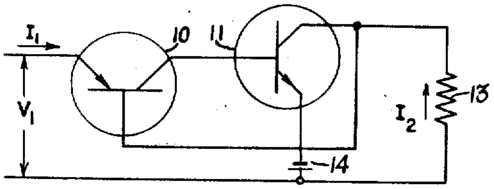
Fig. 6 shows an alternative negative resistance circuit.

Fig. 6 shows an alternative negative resistance circuit which differs from Fig. 1 in that the source of potential 14 is connected directly to the emitter of transistor 11 rather than in series with resistance 13 as shown in Fig. 1. For this configuration, $$V_1 = -I_2 R \qquad (12)$$

and since alpha is approximately unity in the junction transistor then, $$I_2 \cong \frac{\alpha_2}{1-\alpha_2} I_1 \qquad (13)$$

Substituting the value of $I_2$ of Equation 13 in Equation 12 gives, $$V_1 = I_1 R\left[\frac{-\alpha_2}{1-\alpha_2}\right] \qquad (14)$$

Therefore, $$\frac{\partial V_1}{\partial I_1} = -R\left(\frac{\alpha_2}{1-\alpha_2}\right) \qquad (15)$$

Figure 7:
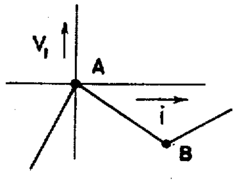
Fig. 7 illustrates the operating characteristics of the network shown in Fig. 6.

It should be noted that Equation 15 is the same as Equation 5 thus providing the desired negative characteristic. The characteristic curve for the circuit of Fig. 6 is shown by Fig. 7. The peak point A of Fig. 7 now appears where $V_1 \cong 0$, which is the basic difference between the operating characteristics of Figs. 1 and 6. This difference will be apparent by comparing Equations 2 and 12. Equation 12 does not include the constant potential source of Equation 2 thus dropping the peak point A on the characteristic curve.

Figure 8:
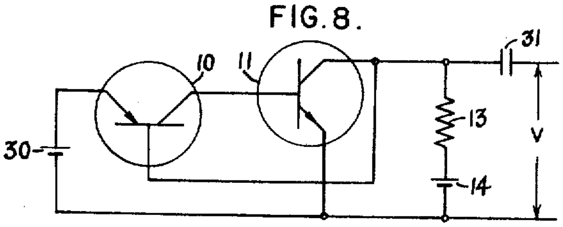
Fig. 8 shows a modification of Fig. 1 using different input terminal connections.

Fig. 8 illustrates a modification of Fig. 1 in which the circuit terminal connections are changed. This is accomplished by inserting a source of potential between the emitters of transistors 10 and 11. The terminal connection is then applied either through coupling capacitor 31 or through a lead across resistance 13 and source 14. If the voltage source 30 is smaller than the voltage at the collector end of resistance 13, then the emitter of transistor 10 will be biased inversely and will not conduct. As an input potential is applied which overcomes this bias, then the emitter conducts and the operation of the circuit is the same as that in the circuit of Fig. 1.

It will also appear obvious to those skilled in the art that the two transistors are complementary, thus interchangeable. Instead of the PNP and NPN configuration shown on Fig. 1, an NPN and PNP transistor configuration may be used with reversed potential connections to source 14. Since other modifications and changes varied to fit particular operating requirements and environments will be apparent to those skilled in the art, the invention is not considered limited to the examples chosen for purposes of disclosure and covers all changes and modifications which do not constitute departures from the spirit and scope of this invention. Having disclosed the aforesaid invention, it is hereby claimed as follows:

What I claim as new and desire to secure by Letters Patent of the United States is:

1. A negative resistance network for obtaining a negative resistance over an extended frequency range comprising first and second junction-type transistor devices each having base, emitter and collector electrodes, said first transistor being of one conductivity type and said second transistor being of an opposite conductivity type, circuit terminal means, means connecting said circuit terminal means to the emitter electrodes of said first and second transistors, means connecting the base electrodes of said first and second transistors to collector electrodes of said second and first transistors, respectively, and a source of potential, a resistance, and an inductance serially connected between the collector and emitter electrodes of said second transistor, said source of potential being oriented in the reverse direction in respect to the direction of easy current flow from the collector of said second transistor.

2. A negative resistance network comprising a P–N–P junction transistor and an N–P–N junction transistor, each of said transistors having base, emitter and collector electrodes, circuit terminal means, means connecting said circuit terminal means to the emitter electrodes of said transistors, means connecting the base electrodes of each of said transistors to the collector electrode of the other, and a source of potential, a resistance and an inductance serially connected between the emitter and collector electrode of one of said transistors, said source of potential being oriented in the reverse direction in respect to the direction of easy current flow from the collector of said one of said transistors.

References Cited in the file of this patent

UNITED STATES PATENTS

| | | |
|---|---|---|
| 2,585,077 | Barney | Feb. 12, 1952 |
| 2,655,609 | Shockley | Oct. 13, 1953 |
| 2,679,633 | Bangert | May 25, 1954 |
| 2,698,416 | Sherr | Dec. 28, 1954 |